United States Patent [19]

Haga et al.

[11] Patent Number: 5,778,756
[45] Date of Patent: Jul. 14, 1998

[54] HYDRAULIC POWER STEERING APPARATUS

[75] Inventors: Kyosuke Haga, Anjo; Mikio Suzuki, Hekinan; Kenichi Fukumura, Aichi-ken, all of Japan

[73] Assignee: Toyoda Koki Kabushiki Kaisha, Kariya, Japan

[21] Appl. No.: 828,366

[22] Filed: Mar. 28, 1997

[30] Foreign Application Priority Data

Mar. 28, 1996 [JP] Japan ................. 8-074449

[51] Int. Cl.⁶ ................. F15B 11/08; F16D 31/02
[52] U.S. Cl. ................. 91/441; 60/468; 60/494
[58] Field of Search ................. 91/437, 464, 441; 60/468, 494

[56] References Cited

U.S. PATENT DOCUMENTS

| | | | |
|---|---|---|---|
| 3,926,210 | 12/1975 | Rasmussen | 91/441 X |
| 4,123,964 | 11/1978 | Strauff | 91/441 X |
| 4,673,051 | 6/1987 | Darling et al. | |
| 5,372,214 | 12/1994 | Haga et al. | |
| 5,471,838 | 12/1995 | Suzuki et al. | 60/468 |
| 5,474,145 | 12/1995 | Haga et al. | |
| 5,515,938 | 5/1996 | Haga et al. | |
| 5,577,573 | 11/1996 | Haga et al. | |
| 5,638,912 | 6/1997 | Haga et al. | |

FOREIGN PATENT DOCUMENTS

6-305432   9/1994   Japan.

*Primary Examiner*—Hoang Nguyen
*Attorney, Agent, or Firm*—Oblon, Spivak, McClelland, Maier & Neustadt, P.C.

[57] ABSTRACT

A hydraulic power steering apparatus includes a fluid pump, a power cylinder, a reservoir, and a control valve connected to the pump via a supply passage including a high pressure hose and connected to the reservoir via a drain passage. The power steering apparatus also includes a bypass passage provided between the supply passage and the drain passage, and a check valve which is disposed in the bypass passage to allow operation fluid to flow only in a direction from the drain passage to the supply passage. The power steering apparatus can supply a sufficient amount of operation fluid to the power cylinder even when a steering wheel is abruptly turned or when an opposing force is input from a tire.

5 Claims, 6 Drawing Sheets

HYDRAULIC POWER STEERING APPARATUS

BACKGROUND OF THE INVENTION

1. Field of the Invention

The present invention relates to a hydraulic power steering apparatus, and more particularly to a hydraulic power steering apparatus that can supply a sufficient amount of operation fluid to a power cylinder even during abrupt steering operations.

2. Description of the Related Art

In a conventional power steering apparatus, when a steering wheel is turned, a control valve is operated in response thereto, so that the pressure of operation fluid supplied from a pump increases, and the operation fluid having an increased pressure is led to a power cylinder. As a result, the steering operation for turning steerable wheels is assisted by the power cylinder.

In such conventional power steering apparatus, a rubber hose is generally disposed on the upstream side of the control valve so as to absorb pulsation of the operation fluid discharged from the pump. Therefore, when the pressure of the operation fluid increases as described upon operation of the control valve, the rubber hose is first expanded, so that part of the operation fluid discharged from the pump is consumed by the expansion of the hose. Although during ordinary steering operations this phenomenon does not affect the steering characteristics, a problem arises when the piston of the power cylinder abruptly moves due to an abrupt steering operation or an opposing force input from a tire. That is, in such case, the pump cannot supply a sufficient amount of operation fluid required for the movement of the piston.

Accordingly, when a driver abruptly turns the steering wheel so as to avoid an imminent obstacle while traveling on a highway, the assistance provided by the power steering stops halfway because the amount of operation fluid fed to the power cylinder becomes insufficient. This makes the driver feel that the steering wheel abruptly becomes difficult to turn. The cause of this problem will be described in more detail with reference to FIG. 1.

Figure 1:
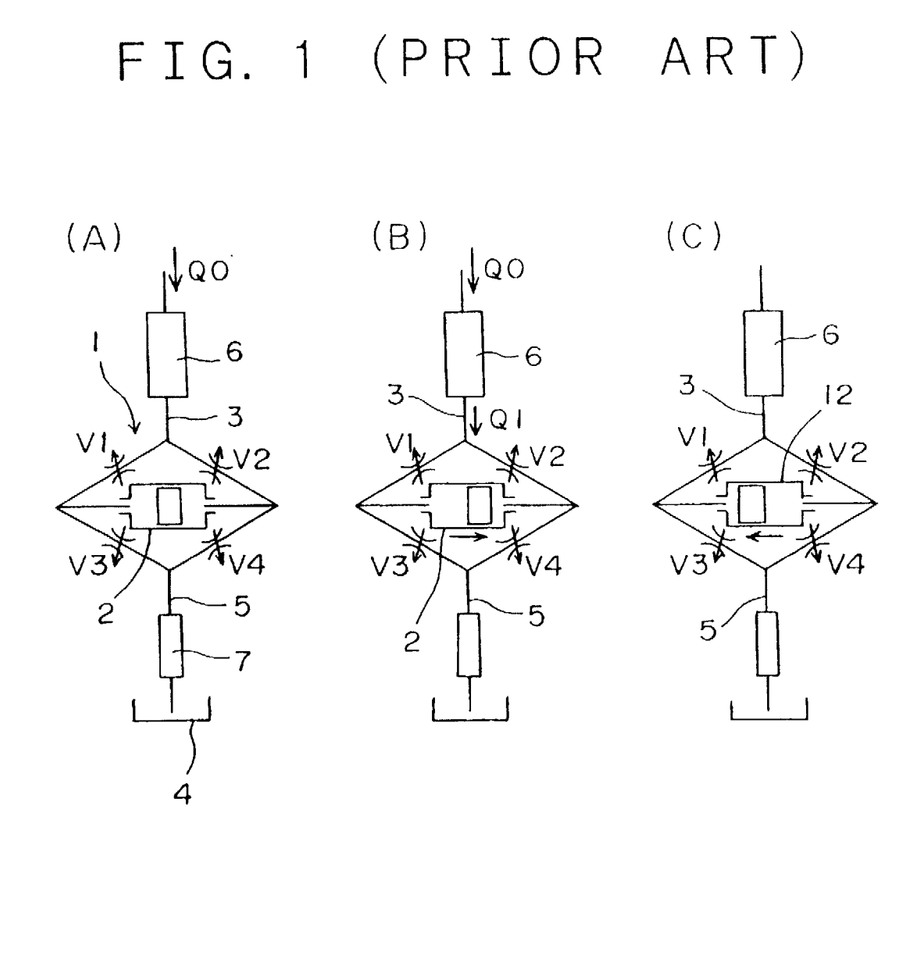
FIG. 1 shows diagrams for explaining an operation of a conventional power steering apparatus when a steering wheel is abruptly turned.

In FIG. 1, numeral 1 denotes a normal-open type control valve, which operates in response to operation of a steering wheel so as to control supply and drain of operation fluid to and from a power cylinder 2. The control valve 1 is disposed between a supply passage 3 communicating with an unillustrated pump and a drain passage 5 communicating with a reservoir 4. A high pressure hose 6 made of rubber is disposed in the supply passage 3 so as to absorb pulsation of the operation fluid discharged from the pump, while a lower pressure hose 7 is disposed in the drain passage 5.

When a steering wheel is in its neutral position (when the vehicle travels straight), as shown in FIG. 1(A), the operation fluid that is supplied from the supply passage 3 to the control valve 1 at a constant flow rate Q0 is equally distributed to two variable orifices V1 and V2 disposed in flow paths communicating with the supply passage 3, and two substantially equal flows respectively pass through two variable orifices V3 and V4 disposed in flow paths communicating with the drain passage 5. The two flows are then merged at the drain passage 5 to be drained to the reservoir 4.

When the steering wheel is abruptly turned in such a neutral state, the opening area of one (for, example V1) of the variable orifices V1 and V2 disposed in the flow paths communicating with the supply passage 3 increases while the opening area of the other variable orifice (V2) decreases. At the same time, as shown in FIG. 1(B), the opening area of one (for example, V3) of the variable orifices V3 and V4 disposed in the flow paths communicating with the drain passage 5 decreases while the opening area of the other variable orifice (V4) increases. Consequently, the pressure in one cylinder chamber (for example, left chamber) of the power cylinder 2 increases, so that the high pressure hose 6 expands and consumes the operation fluid, resulting in an decrease (Q0 to Q1) of the flow rate of the operation fluid supplied to the control valve 1. As a result, it becomes impossible to supply the operation fluid to the power cylinder 2 in an amount corresponding to the turning speed of the steering wheel. In such a case, there arises a so-called assist cease phenomenon in which sufficient assist force is not produced, so that the driver feels that the steering wheel abruptly becomes difficult to turn.

Such insufficient flow rate of the operation fluid supplied to the power cylinder becomes remarkable when the steering wheel is turned in the opposite direction after the above-described abrupt turn of the steering wheel (FIG. 1(C)).

Figure 2:
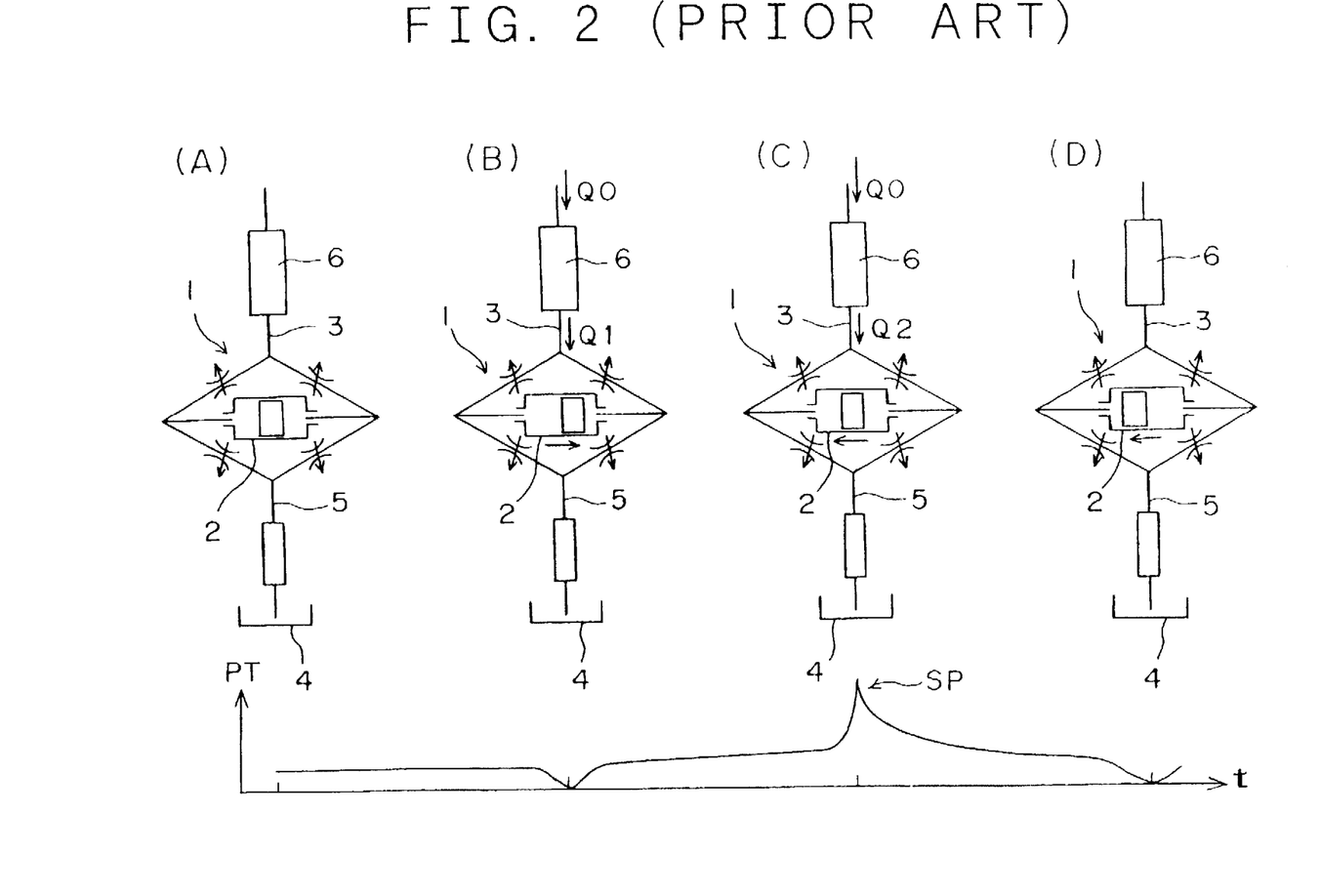
FIG. 2 shows diagrams for explaining an operation of the conventional power steering apparatus when an opposing force is input from a tire.

Moreover, the insufficiency of the flow rate due to abrupt movement of the piston of the power cylinder 2 occurs when an opposing force is input from a tire, as will be described with reference to FIG. 2. When an opposing force is reversely input from a tire in the neutral state shown in FIG. 2(A), the high pressure hose 6 expands due to an increase in the pressure of the operation fluid in a manner identical with that in the above-described abrupt steering. In this case, the flow rate of the operation fluid supplied to the control valve 1 decreases to Q1, as shown in FIG. 2B, so that the pressure (back pressure) PT of the drain passage 5 decreases. When the direction of the opposing force reverses after the initial input of the opposing force, the control valve 1 is brought into the state shown in FIG. 2(D) via the neutral state shown in FIG. 2(C). In the neutral state, the high pressure hose 6 returns from the expanded state to its original state. At this time, since the flow rate of the operation fluid discharged from the drain passage 5 increases from Q1 to Q2 (Q2>Q0), the back pressure PT abruptly increases, so that a so-called surge pressure SP is generated. The generation of the surge pressure SP causes generation of noise and deteriorates the durability of the hose.

SUMMARY OF THE INVENTION

An object of the present invention is to provide an improved hydraulic power steering apparatus that can supply a sufficient amount of operation fluid to a power cylinder even when a steering wheel is abruptly turned or when an opposing force is input from a tire.

In order to achieve the above object, the present invention provides a hydraulic power steering apparatus having a fluid pump, a power cylinder, a reservoir, and a control valve. The control valve has variable throttles provided in fluid passages that communicate respectively with the pump, two fluid chambers of the power cylinder and the reservoir, and responds to operation of a steering wheel so as to control the operation fluid supplied from the pump to the power cylinder through the variable throttles. The power steering apparatus is further provided with bypass means for allowing the operation fluid to flow from a drain passage on the downstream side of the control valve to a supply passage on the upstream side of the control valve.

Preferably, the bypass means is composed of a bypass passage provided between the supply passage and the drain passage, and a check valve which is disposed in the bypass passage so as to allow the operation fluid to flow only in a direction from the drain passage to the supply passage.

Preferably, there is further provided a second check which is disposed in the supply passage so as to allow operation fluid to flow only in a direction from the pump to the control valve.

In the power steering apparatus of the present invention, when a driver abruptly turns the steering wheel, for example, in order to avoid an imminent obstacle while traveling on a highway so that the pressure within the drain passage increases accordingly, the bypass means operates in order to allow the operation fluid drained from one cylinder chamber of the power cylinder to return to the supply passage. The thus-returned operation fluid flows into the other cylinder chamber. As a result, it becomes possible to solve the problem that the assistance provided by the power steering stops halfway, because the amount of operation fluid fed to the power cylinder becomes insufficient, thereby making a driver feel that the steering wheel abruptly becomes difficult to turn.

Moreover, even when the piston of the power cylinder is abruptly moved due to an opposing force from a tire, the generation of surge pressure can be prevented by the above-described bypass means.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF PREFERRED EMBODIMENT

Figure 3:
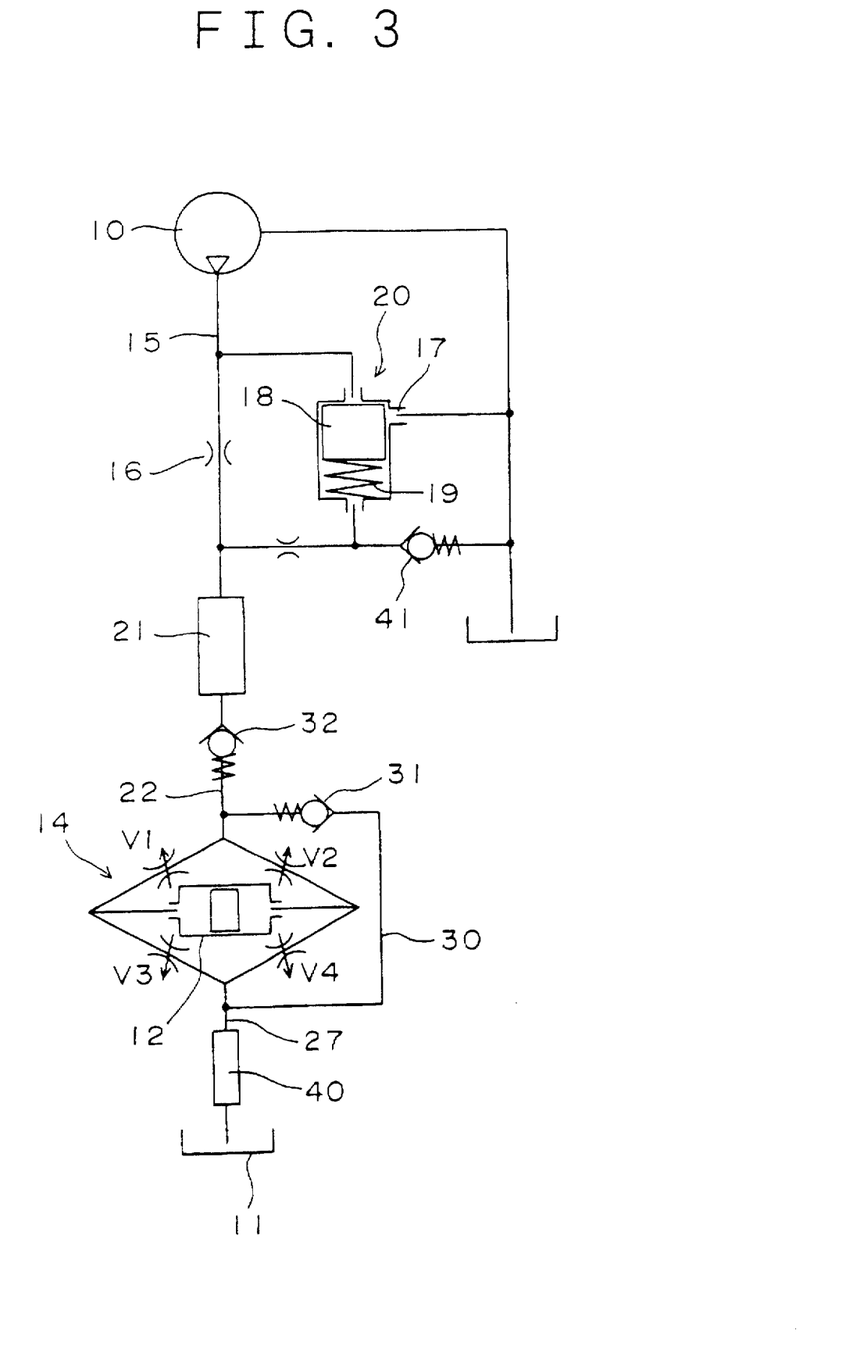
FIG. 3 is a hydraulic system diagram of a power steering apparatus according to an embodiment of the present invention.

An embodiment of the present invention will now be described with reference to the attached drawings. FIG.3 shows an overall structure of a hydraulic power steering apparatus according to the embodiment of the present invention. The power steering apparatus of FIG. 3 comprises a pump 10 driven by an unillustrated engine of a vehicle, a reservoir 11, a power cylinder 12 for assisting steering operations, and a rotary type control valve 14 which operates in response to rotation of a steering wheel so as to throttle and control operation fluid supplied from the pump 10 to the power cylinder 12.

The pump 10 includes a metering orifice 16 provided in a discharge passage 15 and a well known flow control valve 20 connected to the discharge passage 15 in parallel to the metering orifice 16. The flow control valve 20 is composed of a control spool 18 which moves in accordance with a pressure difference across the metering orifice 16 so as to open and close a return passage 17, and a spring 19 which urges the control spool 18 in a direction for closing the return passage 17. The discharge passage 15 is connected to a supply port of the control valve 14 via a rubber-made high pressure hose 21 for absorbing pulsation and a supply passage 22.

Figure 4:
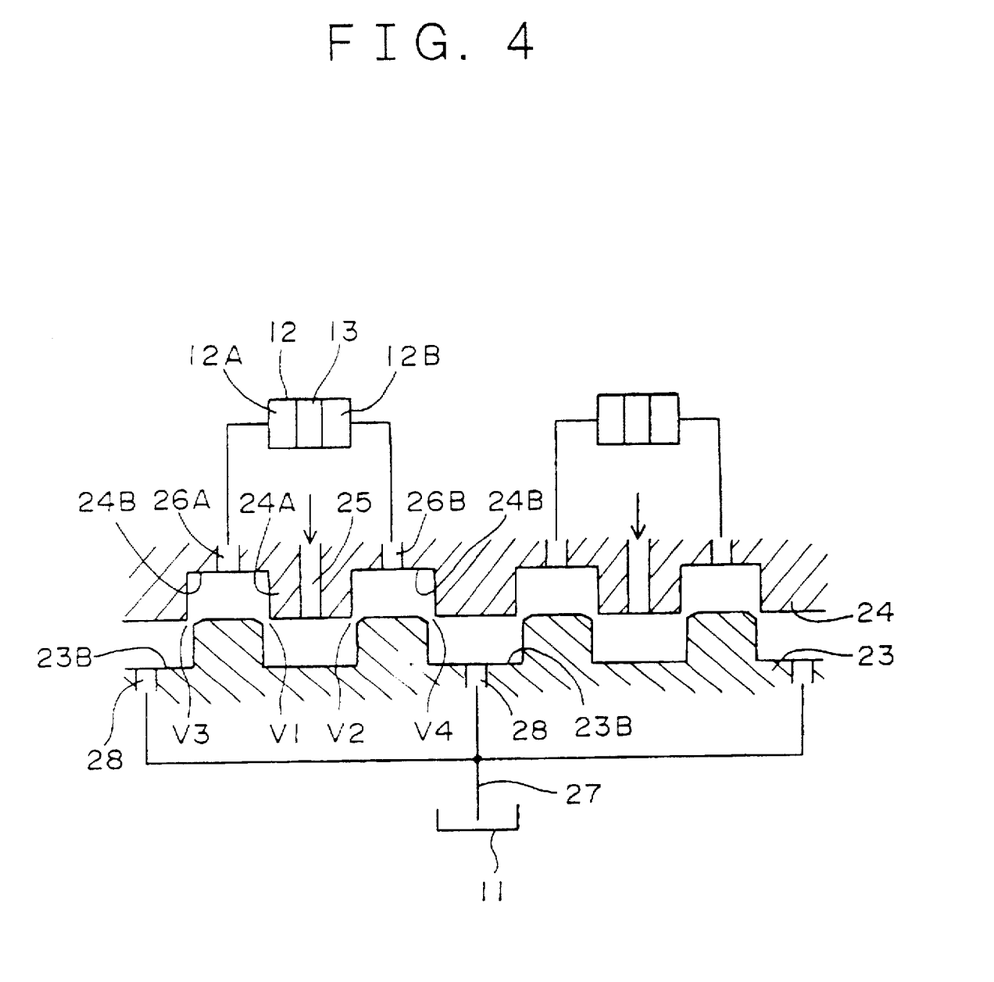
FIG. 4 is a development of a half of a control valve.

As shown in FIG. 4, the control valve 14 is mainly composed of an inner valve 23 which is connected to the steering wheel for rotation therewith, an outer valve 24 which is disposed in a coaxial relationship with the inner valve 23 so as to surround it and which is connected to a steering linkage to which assist force is applied from a power cylinder 12, an unillustrated torsion bar for connecting the inner valve 23 and the outer valve 24 while allowing relative rotation therebetween, and an unillustrated housing for enclosing these components. FIG. 4 shows only one half of the control valve 14 and the remaining half has the same structure. One forth of the control valve 14 in the circumferential direction constitutes one valve unit.

Next, the structure of the inner and outer valves 23 and 24 will be described. As shown in FIG. 4, groove portions and land portions are alternately formed in the circumferential direction on each of the inner and outer valve 23 and 24 such that the respective groove portions of the inner valve 23 (outer valve 24) face the respective land portions of the outer valve 24 (inner valve 23). A supply port 25 communicating with the supply passage 22 is opened to each of alternate land potions 24A among the plurality of land portions formed on the outer valve 24. Two cylinder ports 26A and 26B, which communicate with two fluid chambers 12A and 12B of the power cylinder 12, are opened to two groove portions 24B located on both sides of the land portion to which the supply port 25 is opened. Further, drain ports 28 communicating with the reservoir 11 via a drain passage 27 are opened to two groove portions 23B of the inner valve 23 which correspond to two land portions located on both sides of the groove portions 24B to which the paired cylinder ports 26A and 26B are opened.

Variable throttles V1, V2, V3, and V4 are formed between the land portions of the inner valve 23 and the land portions of the outer valve 24. Each of these variable throttles V1, V2, V3, and V4 serves as an underlap type center open valve.

As shown in FIG. 3, the supply passage 22 and the drain passage 27 are connected with each other via a bypass passage 30 for bypassing the control valve 14. Provided in the bypass passage 30 is a first check valve 31, which prevents operation fluid from flowing from the supply passage 22 to the drain passage 27 but which allows the operation fluid to flow in the direction from the drain passage 27 to the supply passage 22.

Moreover, a second check valve 32 is provided in the supply passage 22 in order to prevent the operation fluid from flowing from the control valve 14 to the pump 10 while allowing the operation fluid to flow from the pump 10 to the control valve 14.

In FIG. 3, numeral 40 denotes a lower pressure hose provided in the drain passage 27, numeral 41 denotes a relief valve for setting an upper limit pressure of the power steering apparatus.

In the power steering of the present embodiment having the above-described structure, the operation fluid discharged from the pump 10 is controlled by the flow control valve 20, so that the operation fluid is supplied, at a constant flow rate, to the supply ports 25 of the control valve 14 via the high pressure hose 21 and the supply passage 22. The operation fluid supplied to the supply ports 25 is drained from the drain ports 28 via a first flow path containing the variable throttles V1 and V3 and a second flow path containing the variable throttles V2 and V4. The two flows are merged at the drain passage 27 to be drained to the reservoir 11.

When the control valve 11 is in its neutral position, all the variable throttles V1, V2, V3, and V4 have the same opening area. In this case, the operation fluid supplied to the supply ports 25 of the control valve 14 is equally drained from the drain ports 28, so that the pressures in the two fluid chambers 12A and 12B of the power cylinder 12 are both low. Therefore, no differential pressure is generated, so that no assist force is produced.

When the steering wheel is turned in such a state, so that the inner valve 23 is rotated, for example, in the leftward direction in FIG. 4, the opening areas of the variable throttles V1 and V4 increase while the opening areas of the variable throttles V2 and V3 decrease. As a result, the pressure in the left fluid chamber 12A of the power cylinder 12 increases while the pressure in the right fluid chamber 12B of the power cylinder 12 decreases, so that the piston 13 of the power cylinder 12 is moved by the pressure difference between the fluid chambers 12A and 12B so as to start assisting the steering operation.

In the conventional power steering apparatus, when a driver abruptly turns the steering wheel, for example, in order to avoid an imminent obstacle while traveling on a highway, the assistance provided by the power steering stops halfway because the pump 10 becomes impossible to supply the amount of operation fluid required by the power cylinder 12. This makes the driver feel that the steering wheel abruptly becomes difficult to turn. Such insufficiency of the operation fluid becomes remarkable when the steering wheel is turned in the opposite direction after the above-described abrupt turn of the steering wheel.

Next, with reference to FIG. 5, a description will be given of the operation of the power steering apparatus of the present embodiment for the case where the steering wheel is abruptly turned in order to avoid a state of emergency (abrupt turn and subsequent reverse turn).

Figure 5:
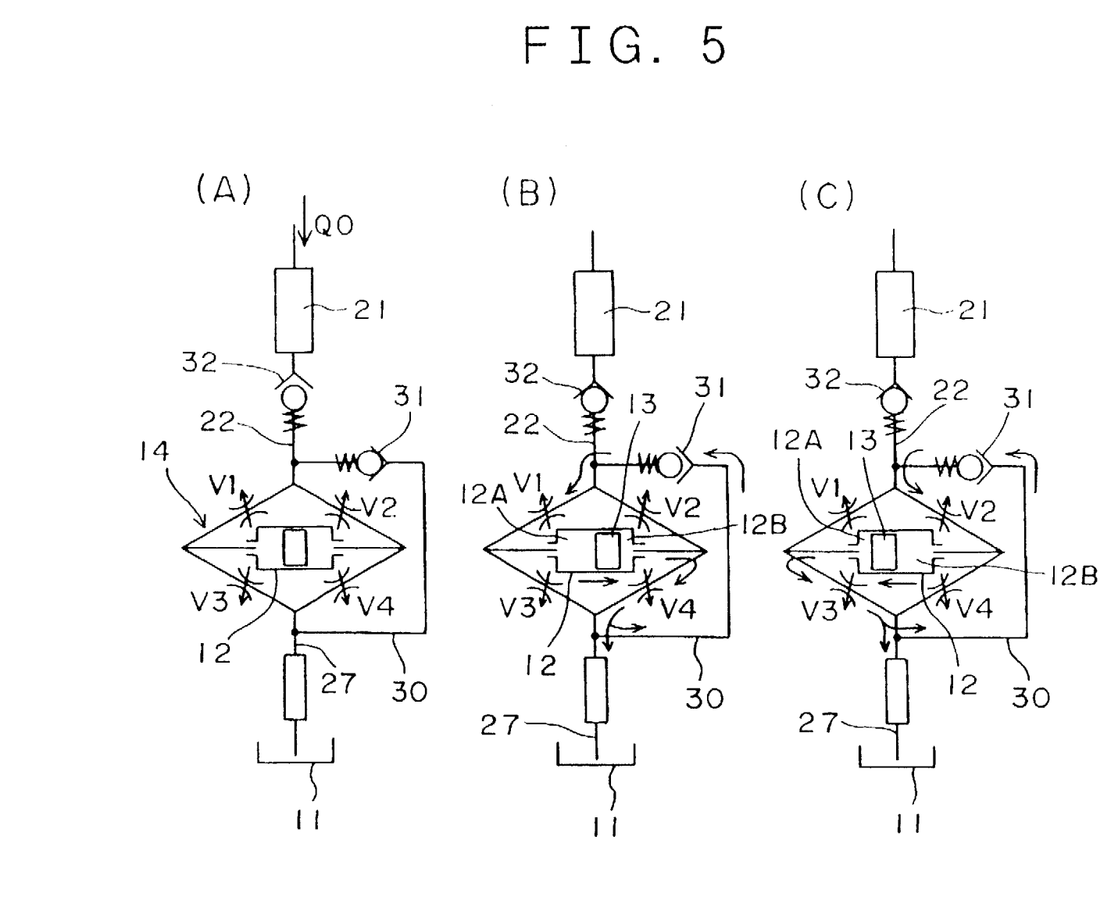
FIG. 5 shows diagrams for explaining an operation of the power steering apparatus according to the embodiment when a steering wheel is abruptly turned.

As shown in FIG. 5(A), when the control valve 14 is in its neutral position, the operation fluid that is supplied from the pump 10 to the supply passage 22 at a constant flow rate Q0 is equally distributed to two variable orifices V1 and V2, and two substantially equal flows respectively pass through two variable orifices V3 and V4. The two flows are then merged at the drain passage 27 to be drained to the reservoir 11.

When the steering wheel is abruptly turned, for example, leftward in order to avoid a sate of emergency, the opening areas of the variable throttles V1 and V4 increase while the opening areas of the variable throttles V2 and V3 decrease. As a result, as shown in FIG. 5(B), a large portion of the operation fluid supplied to the supply passage 22 flows through the variable throttle V1 whose opening area has increased. However, since the throttle resistance of the throttle valve V3 has increased, the pressure in the region between the variable throttles V1 and V3 increases, and the increased pressure is led to the left fluid chamber 12A of the power cylinder 12.

Simultaneously with an abrupt movement of the piston 13 of the power cylinder 12 due to the abrupt steering operation, the high pressure hose 21 expands due to the increase in the pressure of the operation fluid, so that the operation fluid is consumed accordingly. Therefore, there occurs a phenomenon that the amount of the operation fluid supplied from the pump 10 becomes insufficient compared to the amount of operation fluid required by the power cylinder 12.

Meanwhile, due to the abrupt movement of the piston 13 of the power cylinder 12, a large amount of operation fluid is discharged from the right fluid chamber 12B of the power cylinder 12. The thus-discharged operation fluid generally passes through the variable throttle V4 having an increased opening area and is drained to the reservoir 11 via the drain passage 27. At this time, since the operation fluid is drained at a rate greater than the predetermined rate Q0 via the drain passage 27, an internal pressure is generated within the drain passage 27 due to an increase in the drain resistance.

However, in the present embodiment, as shown in FIG. 5(B), the first check valve 31 opens due to the increase of the internal pressure of the drain passage 27, so that the operation fluid discharged from the right fluid chamber 12B of the power cylinder 12 is returned to the supply passage 22 via the check valve 31 and the bypass passage 30. The thus-returned operation fluid flows into the left fluid chamber 12A of the power cylinder 12 via the variable throttle V1 having an increased opening area, so that the problem of insufficient supply of operation fluid to the power cylinder 12 is solved.

At this time, the second check valve 32 is closed due to the above-described increase of the internal pressure, the operation fluid returned to the supply passage 22 via the bypass passage 30 is prevented from flowing toward the high pressure hose 21. This ensures that the returned operation fluid is used to be charged into the left fluid chamber 12A of the power cylinder 12.

When the steering wheel is turned in the opposite direction after the above-described abrupt steering operation, the opening areas of the variable throttles V1 and V4 decrease while the opening areas of the variable throttles V2 and V3 increase. In this case, as shown in FIG. 5(C), a large portion of the operation fluid supplied to the supply passage 22 flows through the variable throttle V2 whose opening area has increased and enters the right fluid chamber 12B of the power cylinder 12. As a insult, the direction of movement of the piston 13 of the power cylinder 12 is abruptly changed, so that the piston 13 starts to move leftward while causing the operation fluid to discharge from the left fluid chamber 12A.

In this case as well, the operation fluid discharged from the left fluid chamber 12A of the power cylinder 12 is returned to the supply passage 22 via the variable throttle V3 having an increased opening area, the drain passage 27, and the bypass passage 30, as in the above-described case. The thus-returned operation fluid flows into the right fluid chamber 12B of the power cylinder 12 via the variable throttle V2 having an increased opening area, so that the problem of insufficient supply of operation fluid to the power cylinder 12 is solved.

Accordingly, even when the steering wheel is abruptly turned or even when the direction of turn of the steering wheel is abruptly changed subsequently, there will not arise the problem that the assistance provided by the power steering stops halfway because the amount of operation fluid fed to the power cylinder 12 becomes insufficient, thereby making a driver feel that the steering wheel abruptly becomes difficult to turn. Moreover, since the operation fluid discharge rate of the pump 10 is not required to unnecessarily increase, the power loss involved in driving the pump 10 does not increase.

Next, a description will be given of the operation for the case in which an opposing force is input from a tire, for example, during traveling on uneven road such as stone-paved road.

Figure 6:
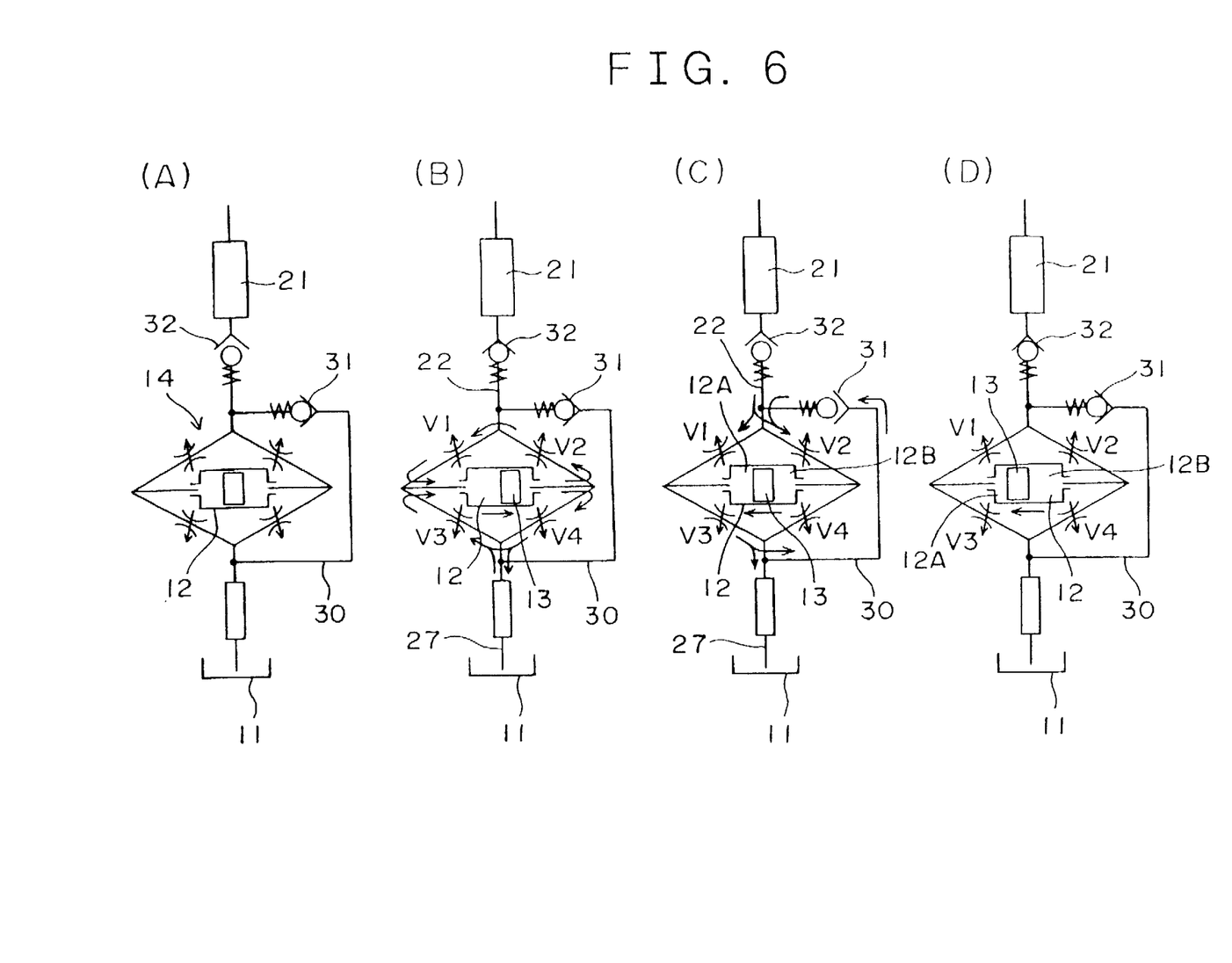
FIG. 6 shows diagrams for explaining an operation of the power steering apparatus according to the present embodiment when an opposing force is input from a tire.

When an opposing force is input from a tire in the neutral state shown in FIG. 6(A), the piston 13 of the power cylinder 12 is abruptly moved, for example, rightward as shown in FIG. 6(B). In this case, the control valve 14 is operated from the outer valve-side, so that the control valve 14 is brought into a state similar to the state in which the steering wheel has been turned leftward. That is, the opening areas of the variable throttles V1 and V4 increase while the opening areas of the variable throttles V2 and V3 decrease. As a result, the second check valve 32 is closed due to an increase in the pressure of the supply passage 22, so that the operation fluid discharged from the power cylinder 12 is prevented from being consumed by the high pressure hose 21.

In this instantaneous state, the increase of the internal pressure due to increase in the drain resistance of the drain passage 27 is not enough to open the first check valve 31 although the part of the operation fluid discharged from the right fluid chamber 12B of the cylinder 12 due to movement of the piston 13 flow into the drain passage 27. So that the reminder of the operation fluid discharged from the right fluid chamber 12B is equally distributed to the first flow path containing the variable throttles V1 and V3 and the second flow path containing the variable throttles V2 and V4. As a result, the left pressure chamber 12A of the power cylinder 12 is sufficiently filled with the operation fluid.

When the direction of the opposing force reverses after the initial input of the opposing force, the piston 13 of the power cylinder 12 is abruptly moved in the direction opposite to the direction in the above-described case. At this time, the control valve 14 is brought into the neutral state shown in FIG. 6(C), in which the pressure of the supply passage 22 decreases, so that the high pressure hose 21 returns from the expanded state to its original state. Accordingly, in the conventional power steering apparatus, the flow rate of the operation fluid passing through the drain passage 27 increases, so that a surge pressure is generated. By contrast, in the present embodiment, due to the increase of the internal pressure due to increase in the drain resistance of the drain passage 27, the first check valve 31 is opened so as to return the operation fluid discharged from the left fluid chamber 12A of the power cylinder 12 to the supply passage 22 via the bypass passage 30, thereby causing the returned operation fluid to flow into the right fluid chamber 12B of the power cylinder 12. This operation solves the problem of insufficient supply of the operation fluid to the power cylinder 12 while preventing the generation of the surge pressure by suppressing the increase in the flow rate of the operation fluid passing through the drain passage 27.

Moreover, when the piston 13 of the power cylinder 12 is moved to the left side after passing through the neutral position as shown in FIG. 6(D), the second check valve 32 is closed due to an increase in the pressure of the supply passage 22, as in the case described with reference to FIG. 6(A), so that the operation fluid discharged from the left fluid chamber 12A of the cylinder 12 due to movement of the piston 13 is equally distributed to the first flow path containing the variable throttles V1 and V3 and the second flow path containing the variable throttles V2 and V4. As a result, the right pressure chamber 12B of the power cylinder 12 is sufficiently filled with the operation fluid.

Obviously, numerous modifications and variations of the present invention are possible in light of the above teachings. It is therefore to be understood that within the scope of the appended claims, the present invention may be practiced otherwise than as specifically described herein.

What is claimed is:

1. A hydraulic power steering apparatus having a fluid pump, a power cylinder, a reservoir, and a control valve connected to said pump via a supply passage including a high pressure hose and connected to said reservoir via a drain passage, said control valve having variable throttles disposed in fluid passages that communicate respectively with said supply passage, two fluid chambers of said power cylinder and said drain passage, and being responsive to operation of a steering wheel so as to control operation fluid supplied from said pump to said power cylinder, wherein bypass means is further provided to allow operation fluid to flow from said drain passage on the downstream side of said control valve to said supply passage on the upstream side of said control valve.

2. A hydraulic power steering apparatus according to claim 1, wherein said bypass means is composed of a bypass passage provided between said supply passage and said drain passage, and a first check valve which is disposed in said bypass passage to allow operation fluid to flow only in a direction from said drain passage to said supply passage.

3. A hydraulic power steering apparatus according to claim 1, further comprising a second check valve which is provided in said supply passage so as to allow operation fluid to flow only in a direction from said pump to said control valve.

4. A hydraulic power steering apparatus according to claim 2, further comprising a second check valve which is provided in said supply passage so as to allow operation fluid to flow only in a direction from said pump to said control valve.

5. A hydraulic power steering apparatus having a fluid pump, a power cylinder, a reservoir, and a control valve connected to said pump via a supply passage including a high pressure hose and connected to said reservoir via a drain passage, said control valve having variable throttles disposed in fluid passages that communicate respectively with said supply passage, two fluid chambers of said power cylinder and said drain passage, and being responsive to operation of a steering wheel so as to control operation fluid supplied from said pump to said power cylinder, wherein said power steering apparatus further comprises:

a bypass passage provided between said supply passage and said drain passage;

a first check valve which is disposed in said bypass passage to allow operation fluid to flow only in a direction from said drain passage to said supply passage; and a second check valve which is provided in said supply passage so as to allow operation fluid to flow only in a direction from said pump to said control valve.

* * * * *